United States Patent
Nishi

(10) Patent No.: US 9,379,647 B2
(45) Date of Patent: Jun. 28, 2016

(54) MOTOR DRIVING CONTROL DEVICE AND CONTROL METHOD OF MOTOR DRIVING CONTROL DEVICE

(71) Applicant: MINEBEA CO., LTD., Kitasaku-Gun, Nagano (JP)

(72) Inventor: Shuhei Nishi, Yonago (JP)

(73) Assignee: Minebea Co., Ltd., Nagano (JP)

( * ) Notice: Subject to any disclaimer, the term of this patent is extended or adjusted under 35 U.S.C. 154(b) by 17 days.

(21) Appl. No.: 14/488,482

(22) Filed: Sep. 17, 2014

(65) Prior Publication Data

US 2015/0084557 A1    Mar. 26, 2015

(30) Foreign Application Priority Data

Sep. 20, 2013  (JP) ................................ 2013-195335

(51) Int. Cl.
| | |
|---|---|
| H02P 1/52 | (2006.01) |
| H02P 1/02 | (2006.01) |
| H02P 6/06 | (2006.01) |
| H02P 6/08 | (2016.01) |

(52) U.S. Cl.
CPC *H02P 1/52* (2013.01); *H02P 1/029* (2013.01); *H02P 6/06* (2013.01); *H02P 6/08* (2013.01)

(58) Field of Classification Search
CPC ............. H02P 1/52; H02P 1/029; H02P 6/06; H02P 6/08; H02P 6/165
See application file for complete search history.

(56) References Cited

U.S. PATENT DOCUMENTS

| | | | | |
|---|---|---|---|---|
| 2007/0135761 A1* | 6/2007 | Cheng | ..................... | A61M 1/06 604/74 |
| 2010/0194315 A1* | 8/2010 | Kusakawa | ............... | B25B 21/00 318/379 |
| 2011/0181215 A1* | 7/2011 | Nakagawara | ......... | H02P 29/027 318/400.11 |
| 2011/0227520 A1* | 9/2011 | Kitagawa | ................ | H02P 6/142 318/400.14 |
| 2012/0195610 A1* | 8/2012 | Fujishiro | .............. | G03G 15/043 399/51 |

FOREIGN PATENT DOCUMENTS

JP    2001-211682 A    8/2001

* cited by examiner

*Primary Examiner* — Shawki S Ismail
*Assistant Examiner* — Muhammad S Islam
(74) *Attorney, Agent, or Firm* — Carrier Blackman & Associates, P.C.; Joseph P. Carrier; Jeffrey T. Gedeon

(57) ABSTRACT

There is provided a motor driving control device including a state determining unit which determines whether a motor can perform a slow start operation based on a rotating state and a driving state of the motor, a control unit which generates command information corresponding to a speed at which the motor is to be rotated, based on a determination result of the state determining unit, and a motor driving unit which outputs a driving signal corresponding to the command information generated by the control unit to the motor so as to drive the motor. When it is determined that the motor can perform the slow start operation, the control unit generates the command information such that the motor performs the slow start operation.

5 Claims, 7 Drawing Sheets

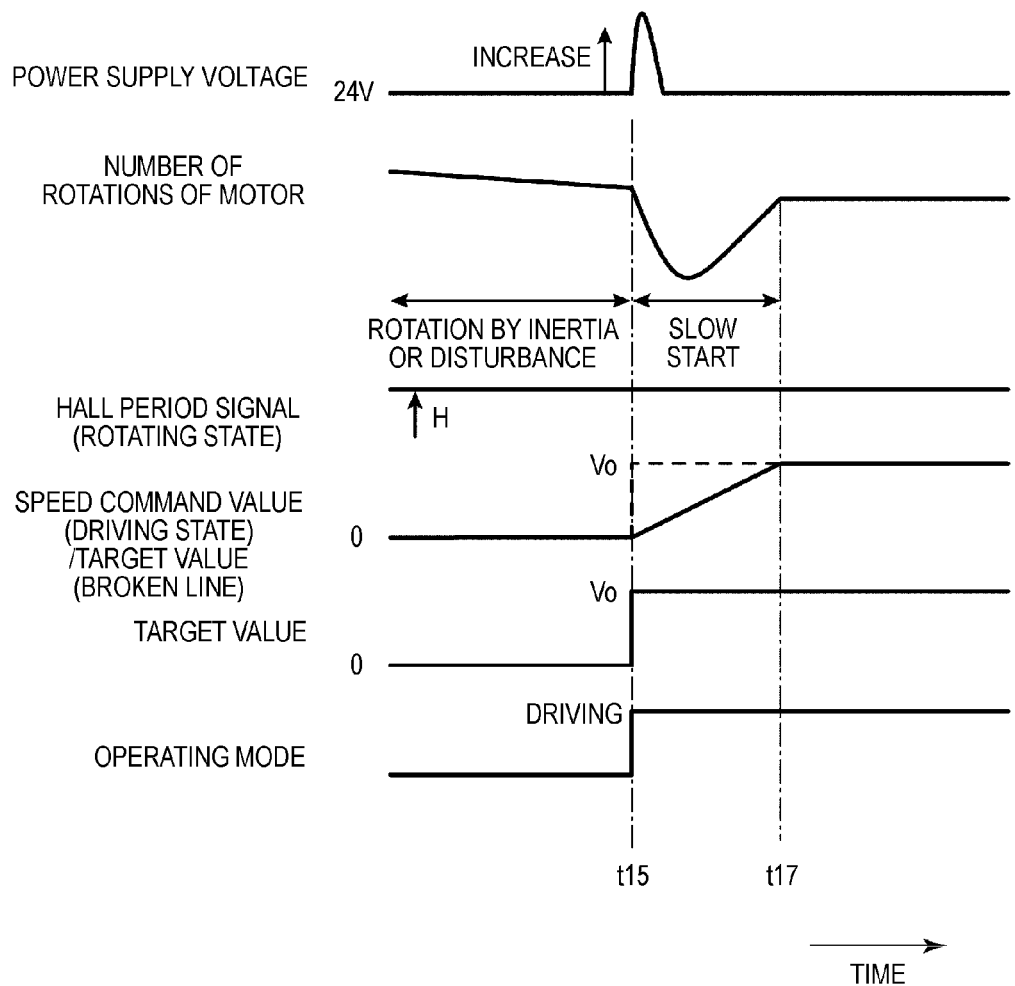

MOTOR DRIVING CONTROL DEVICE AND CONTROL METHOD OF MOTOR DRIVING CONTROL DEVICE

CROSS-REFERENCE TO RELATED APPLICATION

This application claims priority from Japanese Patent Application No. 2013-195335, filed on Sep. 20, 2013, the entire subject matter of which is incorporated herein by reference.

BACKGROUND OF THE INVENTION

1. Field of the Invention

The present invention relates to a motor driving control device and a control method of the motor driving control device, and more particularly, to a motor driving control device configured to control driving of a motor in accordance with a command signal input from an outside, and a control method of the motor driving control device.

2. Description of the Related Art

As a method of controlling a rotating speed of a motor (for example, a brushless DC motor used as a fan motor or an electric fan motor) by a motor driving control device, there has been used a function (a so-called slow start (soft start) function) of gradually increasing power to be fed to the motor by PWM control and thus gradually increasing the rotating speed so as to silently start the motor.

When driving the motor by the synchronous rectification-type motor driving control device having the slow start function, if the motor is rotated by inertia or disturbance, a problem may occur. That is, when the motor performs a slow start operation while the motor is rotated by inertia or disturbance, a negative current (regenerative current) is generated. If the generated negative current cannot be completely absorbed in a capacitor and the like provided for a power supply unit of a driving circuit of the motor driving control device, a power supply voltage becomes excessive, so that the driving circuit may be damaged.

FIG. 7 is a timing chart showing an example of a slow start operation in a related-art motor driving control device.

FIG. 7 shows, from the upper, changes of a power supply voltage of the motor driving control device, the number of rotations (a rotating speed) of a motor, which is a driving target, a Hall period signal (a signal indicating a rotating state of the motor) obtained from a Hall signal of the motor, a speed command value (a signal indicating a driving state of the motor) generated so as to drive the motor, a target value corresponding to the target number of rotations (a target rotating speed) of the motor and an operating mode of the motor driving control device, over time, respectively.

It is assumed a case where, in a state where the driving of the motor is stopped and the speed command value is zero, the operating mode is set to a driving mode and the target number of rotations of the motor is set to Vo (a time t15). In this case, after the time t15, the speed command value is controlled to increase from zero to Vo, and a larger driving current gradually flows in the motor. At a time t17, the speed command value reaches Vo to achieve the target number of rotations of the motor.

Here, when it has reached the time t15 in a state where the motor is being rotated by the disturbance and the like, the driving current gently flows in the motor from the time t15 even though the motor is being rotated. Thus, the regenerative current which is generated by the rotation of the motor flows back to the motor driving control device, so that the power supply voltage rapidly increases temporarily. When the power supply voltage becomes excessive, the power supply unit of the motor driving control device may be damaged.

Regarding the above-described problem, JP-A-2001-211682 discloses a control device of a brushless motor, in which a driving unit is supplied with a voltage corresponding to a detected rotating speed, instead of a command voltage, for a predetermined time period from a time when an alternating current voltage is re-input to the brushless motor after interruption.

However, the control device disclosed in JP-A-2001-211682 needs a circuit for detecting a power interruption and a circuit for switching a voltage, so that the circuit configuration becomes complex and the manufacturing cost is thus increased.

SUMMARY

The present invention has been made in view of the above circumstances, and it is an object of the present invention to provide a motor driving control device having a simple circuit configuration and capable of suppressing an increase in a power supply voltage at any rotating state or any driving state of a motor, and a control method of the motor driving control device.

According to an illustrative embodiment of the present invention, there is provided a motor driving control device comprising: a rotation detecting unit configured to detect a rotating state of a motor; a drive detecting unit configured to detect a driving state of the motor; a command acquiring unit configured to acquire first command information for starting the motor; a state determining unit configured to determine whether the motor can perform a slow start operation based on a detection result of the rotation detecting unit and a detection result of the drive detecting unit, when the command acquiring unit acquires the first command information; a control unit configured to generate second command information corresponding to a speed at which the motor is to be rotated, based on a determination result of the state determining unit and the first command information acquired by the command acquiring unit; and a motor driving unit configured to output a driving signal corresponding to the second command information generated by the control unit to the motor so as to drive the motor, wherein when it is determined that the motor can perform the slow start operation, the control unit is configured to generate the second command information such that the motor performs the slow start operation.

In the above motor driving control device, the drive detecting unit may be configured to detect the driving state of the motor based on the second command information generated by the control unit.

In the above motor driving control device, the rotation detecting unit may be configured to detect whether a rotating speed of the motor is smaller than a predetermined value, and the drive detecting unit may be configured to detect whether the driving of the motor is stopped.

In the above motor driving control device, in a state where the drive detecting unit detects that the driving of the motor is stopped, the state determining unit may be configured to determine that the motor can perform the slow start operation when the rotation detecting unit detects that the rotating speed of the motor is smaller than the predetermined value.

In the above motor driving control device, the state determining unit may be configured to determine that the motor can perform the slow start operation when the drive detecting unit detects that the driving of the motor is not stopped.

The above motor driving control device may further comprise a short brake unit configured to control the motor driving unit such that the motor becomes a short brake state when the drive detecting unit detects that the driving of the motor is stopped and when the rotation detecting unit detects that the rotating speed of the motor is not smaller than the predetermined value.

In the above motor driving control device, a part or all of the motor driving control device may be packaged as an integrated circuit device.

According to another illustrative embodiment of the present invention, there is provided a control method of a motor driving control device including: a rotation detecting unit configured to detect a rotating state of a motor; a drive detecting unit configured to detect a driving state of the motor; and a command acquiring unit configured to acquire first command information for starting the motor. The control method comprises: when the command acquiring unit acquires the first command information, determining whether the motor can perform a slow start operation based on a detection result of the rotation detecting unit and a detection result of the drive detecting unit; generating second command information corresponding to a speed at which the motor is to be rotated, based on a determination result of the state determining unit and the first command information acquired by the command acquiring unit; and outputting a driving signal corresponding to the generated second command information to the motor so as to drive the motor, wherein when it is determined that the motor can perform the slow start operation, the generating step generates the second command information such that the motor performs the slow start operation.

According to the above configuration, when the first command information for starting the motor is acquired, it is determined whether the motor can perform the slow start operation based on the detection results of the rotating state and the driving state of the motor. Therefore, it is possible to provide a motor driving control device having a simple circuit configuration and capable of suppressing an increase in a power supply voltage at any rotating state or any driving state of the motor, and a control method of the motor driving control device.

BRIEF DESCRIPTION OF THE DRAWINGS

In the accompanying drawings:

FIG. 7 is a timing chart showing an example of a slow start operation in a related-art motor driving control device.

DETAILED DESCRIPTION

Hereinafter, a motor driving control device according to an illustrative embodiment of the present invention will be described.

[Illustrative Embodiments]

Figure 1:
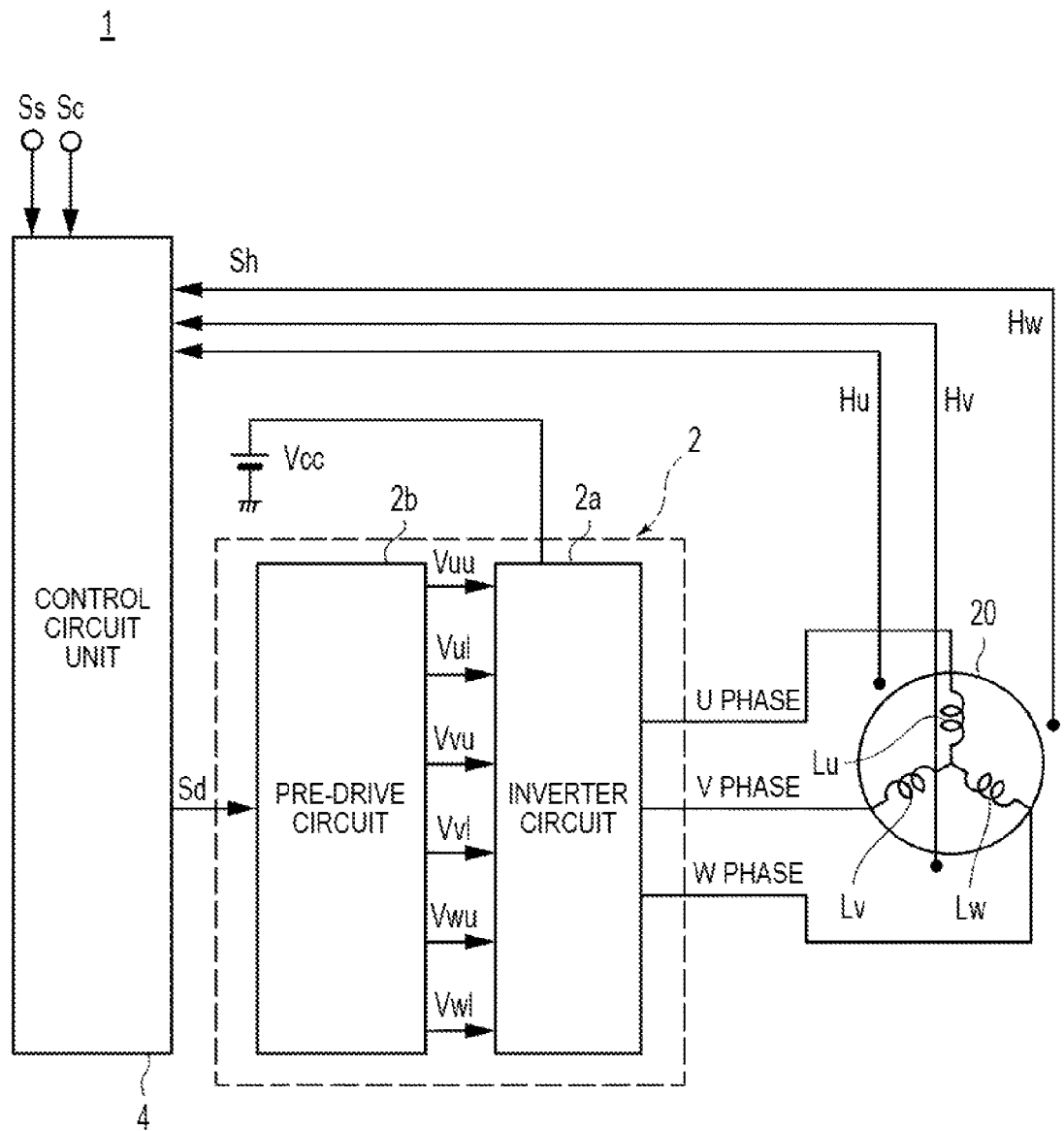
FIG. 1 is a block diagram showing a circuit configuration of a motor driving control device according to an illustrative embodiment of the present invention.

FIG. 1 is a block diagram showing a circuit configuration of a motor driving control device according to an illustrative embodiment of the present invention.

As shown in FIG. 1, a motor driving control device 1 is configured to drive a motor 20 by, for example, a sine wave. In this illustrative embodiment, the motor 20 is a three-phase brushless motor, for example. The motor driving control device 1 rotates the motor 20 by supplying a sinusoidal driving current to armature coils Lu, Lv, Lw of the motor 20, based on a rotating position signal of a rotor.

In this illustrative embodiment, the rotating position signal of the rotor is a signal which is obtained by estimating a rotating position of a rotor from an output signal of a Hall element (not shown).

The motor driving control device 1 includes a motor driving unit (an example of a motor driving unit) 2 having an inverter circuit 2a and a pre-drive circuit 2b, and a control circuit unit 4. Incidentally, the constituent elements of the motor driving control device 1 shown in FIG. 1 is a part of the whole device, and the motor driving control device 1 may have other constituent elements, in addition to those shown in FIG. 1.

In this illustrative embodiment, the motor driving control device 1 is an integrated circuit device (IC) in which the entirety thereof is packaged. Incidentally, a part of the motor driving control device 1 may be packaged as one integrated circuit device, or all or a part of the motor driving control device 1 may be packaged together with another device to configure one integrated circuit device.

The inverter circuit 2a configures the motor driving unit 2 together with the pre-drive circuit 2b. The inverter circuit 2a outputs a driving signal to the motor 20 based on an output signal from the pre-drive circuit 2b, and energizes the armature coils Lu, Lv, Lw of the motor 20. For example, a series circuit pair of two switch elements provided at both ends of a direct current power supply Vcc is provided for each phase (U phase, V phase and W phase) of the armature coils Lu, Lv, Lw, so that the inverter circuit 2a is configured. In each pair of the two switch elements, a connection point of the switch elements is connected with a terminal of each phase of the motor 20, which is not shown.

The pre-drive circuit 2b generates output signals for driving the inverter circuit 2a based on the control of the control circuit unit 4, and outputs the same to the inverter circuit 2a. As the output signals, six types of signals Vuu, Vul, Vvu, Vvl, Vwu, Vwl corresponding to the respective switch elements of the inverter circuit 2a are output, for example. The output signals are output, so that the switch element corresponding to each output signal is turned on/off, the driving signal is output to the motor 20 and the power is thus fed to each phase of the motor 20.

In this illustrative embodiment, the control circuit unit 4 acquires a rotating speed command signal Sc and a start signal Ss, which are input from an outside, and controls the driving of the motor 20 based on those signals. The rotating speed command signal Sc and the start signal Ss are signals (an example of first command information) which are input so as to start the motor.

The rotating speed command signal Sc is a signal relating to the number of rotations of the motor 20, and for example, a PWM (Pulse Width Modulation) signal corresponding to a target rotating speed of the motor 20. In other words, the rotating speed command signal Sc is information corresponding to a target value of the rotating speed of the motor 20. Incidentally, a clock signal may be input as the rotating speed command signal Sc.

The start signal Ss is a signal for setting a control mode of the motor driving control device 1. That is, the start signal Ss is a signal for setting a driving mode of performing the driving control of the motor 20 or a standby mode of not performing the driving control. Incidentally, the start signal Ss and another control signal (a brake signal and the like) may be input, and the control mode may be switched to the driving mode when both signals become predetermined values, respectively.

In this illustrative embodiment, in a state where the control mode is set to the driving mode based on the start signal Ss, when a value, which is not zero (the speed is not zero), is input as the rotating speed command signal Sc, the motor 20 is driven to rotate at a speed corresponding to the rotating speed command signal Sc. When the control mode is not the driving mode, the motor 20 is not driven. In a state where the motor 20 is not driven, when the control mode is switched to the driving mode and a value, which is not zero, is input as the rotating speed command signal Sc, the motor 20 is started (the driving of the motor 20 starts). On the other hand, when '0' (the speed is zero) is input as the rotating speed command signal Sc in a state where the control mode is set to the driving mode, the motor 20 becomes a short brake state.

Also, the control circuit unit 4 is input with three Hall signals Hu, Hv, Hw (hereinafter, the three Hall signals Hu, Hv, Hw may be collectively referred to as the Hall signal Sh) from the motor 20. The Hall signal Sh is outputs of three Hall elements arranged in the motor 20. The control circuit unit 4 acquires the information about the rotating position of the motor 20, the number of rotations (Hall FG signal) and the like by using the Hall signal Sh, thereby detecting a rotating state of the motor 20 to control the driving of the motor 20.

The control circuit unit 4 may be input with another information relating to the rotating state of the motor 20 together with or instead of the information obtained using the Hall elements. For example, as an FG signal corresponding to the rotation of the rotor of the motor 20, a signal (pattern FG), which is generated using a coil pattern provided for a substrate of the rotor side, may be input. Also, a rotating position detection circuit for detecting a back electromotive voltage induced to each phase (U phase, V phase and W phase) of the motor 20 may be provided, and the rotating position and the number of rotations of the rotor of the motor 20 may be detected based on the detected back electromotive voltage. Alternatively, a sensor signal of an encoder and the like for detecting the number of rotations and rotating position of the motor may be used.

The control circuit unit 4 is configured by a microcomputer, a digital circuit and the like, for example. The control circuit unit 4 outputs a driving control signal Sd to the pre-drive circuit 2b based on the Hall signal Sh, the rotating speed command signal Sc, the start signal Ss and the rotating position signal. The control circuit unit 4 outputs the driving control signal Sd to control the rotation of the motor 20 such that the motor 20 is rotated at the number of rotations corresponding to the rotating speed command signal Sc. That is, the control circuit unit 4 outputs the driving control signal Sd for driving the motor 20 to the motor driving unit 2 to thus control the motor driving unit 2, thereby controlling the rotation of the motor 20. The motor driving unit 2 outputs the driving signal to the motor 20 based on the driving control signal Sd, thereby driving the motor 20.

[Control Circuit Unit 4]

Figure 2:
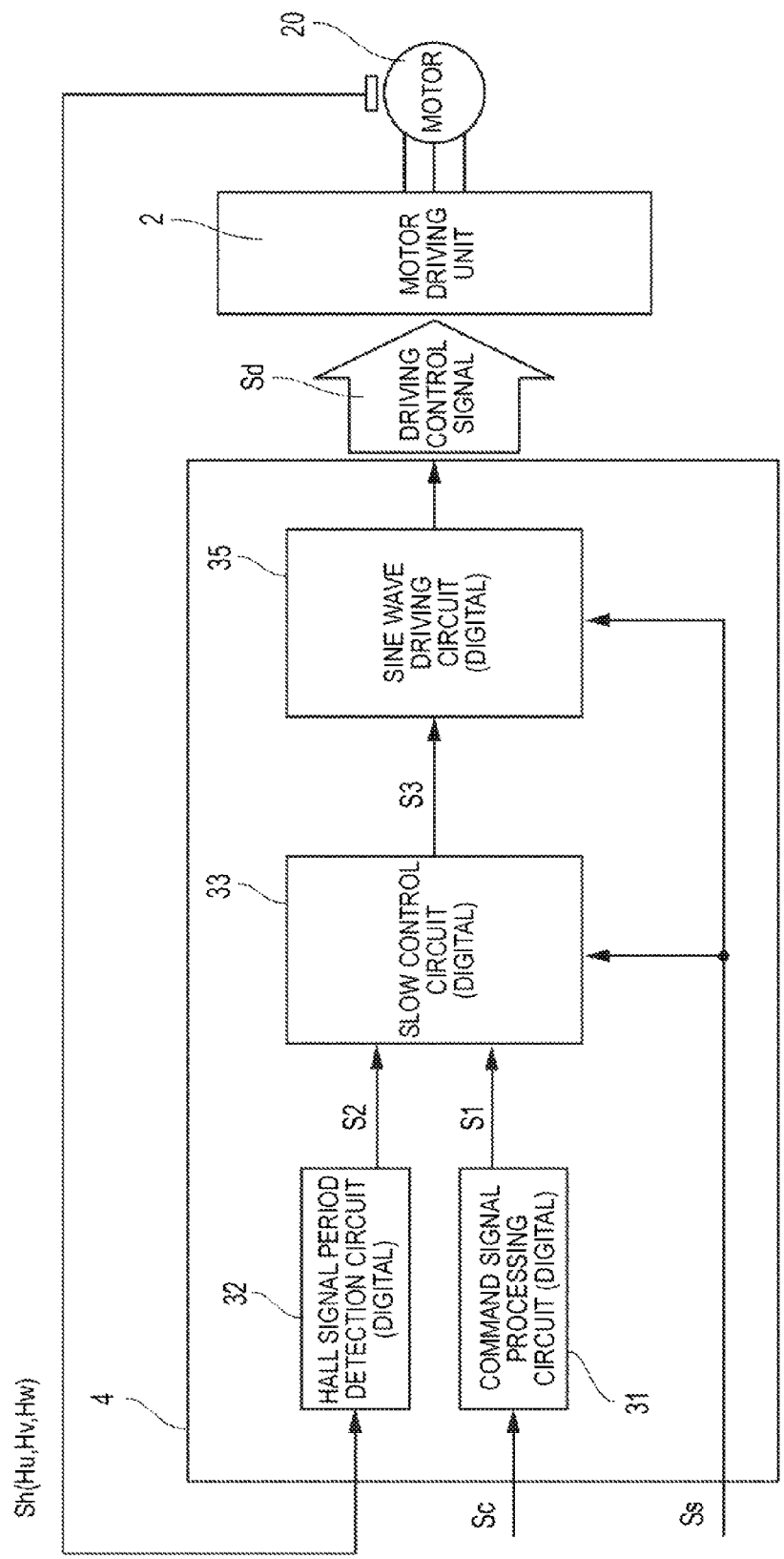
FIG. 2 is a block diagram showing a configuration of a control circuit unit.

FIG. 2 is a block diagram showing a configuration of the control circuit unit 4.

As shown in FIG. 2, the control circuit unit 4 includes a command signal processing circuit 31, a Hall signal period detection circuit 32, a slow control circuit (an example of a rotation detecting unit, a drive detecting unit, a command acquiring unit, a state determining unit, a control unit and a short brake unit) 33, and a sine wave driving circuit 35. Each circuit is a digital circuit. In FIG. 2, the transmission and reception of signals, information and the like between the respective circuits are shown in relation to generation of second command information S3 (described later).

The command signal processing circuit 31 is input with the rotating speed command signal Sc. The command signal processing circuit 31 outputs speed command information S1 such that the number of rotations of the motor 20 becomes the target number of rotations based on the rotating speed command signal Sc. Specifically, for example, the command signal processing circuit 31 may output speed command information S1 which is uniquely determined based on a duty ratio of the rotating speed command signal Sc or speed command information S1, which is obtained by comparing a clock signal (serves as the rotating speed command signal) corresponding to the target number of rotations of the motor 20 and the motor rotating speed information by speed feedback control. The speed command information S1 is a target value corresponding to the target rotating speed of the motor 20 based on the rotating speed command signal Sc. The speed command information S1 is input to the slow control circuit 33.

The Hall signal period detection circuit 32 is input with the Hall signals Hu, Hv, Hw (Hall signal Sh). The Hall signal period detection circuit 32 generates a three-phase synthesized signal of the input Hall signal Sh and outputs a signal corresponding to a period thereof, as a Hall period signal S2. The Hall period signal S2 is information corresponding to the rotating speed of the motor 20 and indicating a rotating state of the motor 20. The Hall period signal S2 is input to the slow control circuit 33.

The slow control circuit 33 is input with the speed command information S1 and the Hall period signal S2, which are output as described above. Also, the slow control circuit 33 is input with the start signal Ss. The slow control circuit 33 determines whether the control mode is the driving mode based on the start signal Ss. When the control mode is the driving mode, the slow control circuit 33 outputs second command information S3 based on the input signals. The second command information S3 is a speed command corresponding to the speed at which the motor is to be rotated.

The sine wave driving circuit 35 is input with the start signal Ss and the second command information S3. The sine wave driving circuit 35 determines whether the control mode is the driving mode based on the start signal Ss. When the control mode is the driving mode, the sine wave driving circuit 35 generates and outputs the driving control signal Sd for driving the motor driving unit 2 based on the second command information S3. The driving control signal Sd is output to the motor driving unit 2, so that the driving signal Sd is output from the motor driving unit 2 to the motor 20, and the motor 20 is thus driven. That is, the driving signal is a signal corresponding to the second command information S3 and the speed at which the motor is to be rotated.

[Operations of Slow Control Circuit 33]

In this illustrative embodiment, the slow control circuit 33 has a speed control function of performing control such that the actual number of rotations of the motor 20 is gently changed when the target value of the number of rotations of the motor 20 is changed. Thereby, the motor driving control device 1 can execute operations of a slow start function, a slow stop function, a slow acceleration function, a slow deceleration function, and the like.

Figure 3:
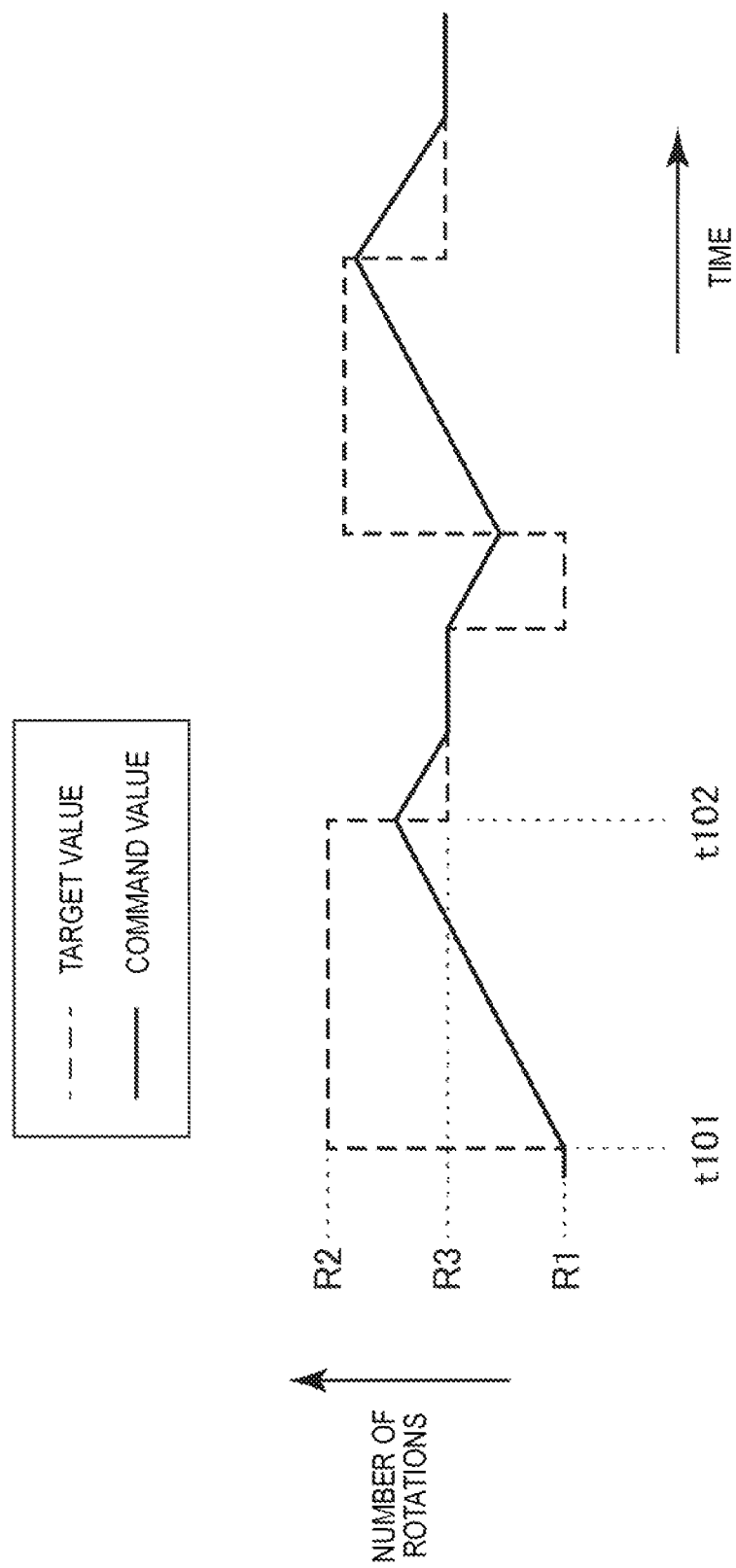
FIG. 3 is an explanatory diagram showing a speed control function of a slow control circuit.

FIG. 3 is an explanatory diagram showing the speed control function of the slow control circuit 33.

In FIG. 3, a broken line corresponds to the target value of the number of rotations, i.e., the speed command information S1, and a solid line corresponds to the command value, i.e., the second command information S3. When the target value is changed, the slow control circuit 33 changes the command value towards the target value with a predetermined gradient determined by a counter circuit.

For example, it is assumed a case where the target value is changed from a first value R1 before a time t101 to a second value R2 larger than the first value R1 at the time t101 and is changed to a third value R3 larger than the first value R1 and smaller than the second value R2 at a time t102. When the command value is the first value R1 at the time t101, the command value is changed towards the second value R2 after the time t101. At this time, since the command value is changed by a predetermined amount over time, it is gradually increased. After the command value becomes larger than the third value R3, if the target value is changed to the third value R3 at the time t102, the command value is decreased towards the third value R3 from the time t102. Even at the decreasing time, the command value is gradually changed, like at the increasing time. When the command value reaches the target value, the command value is kept as it is.

Accordingly, the command value is gradually changed, so that the number of rotations of the motor 20 is securely changed to follow the command value, and the operation of the motor 20 is not rapidly changed. Therefore, it is possible to suppress abnormal sound, vibration and the like from being generated at a start of the motor 20. Incidentally, the degree that the command value is gradually increased or decreased may be determined in accordance with a setting value stored in a memory and the like provided in the control circuit unit 4, for example.

Here, the slow control circuit 33 detects the rotating state and the driving state of the motor 20 based on the input signals. Then, the slow control circuit 33 generates the second command information S3 based on the detection results thereof, the speed command information S1 and the start signal Ss.

That is, as the rotating state of the motor 20, the slow control circuit 33 detects whether the rotating speed of the motor 20 is smaller than a predetermined value based on the Hall period signal S2. In this illustrative embodiment, the slow control circuit 33 determines that the rotating speed of the motor 20 is smaller than the predetermined value when the Hall period signal S2 is low (L).

Incidentally, the Hall period signal S2 is a signal which becomes low (L) when the Hall period is 27 milliseconds or longer and becomes high (H) when a falling edge of the Hall signal is counted four times in a state where the Hall period is shorter than 27 milliseconds, for example.

Also, as the driving state of the motor 20, the slow control circuit 33 detects whether the driving of the motor 20 is stopped based on the generated second command information S3.

In this illustrative embodiment, the slow control circuit 33 performs the following control at the start of the driving of the motor 20. That is, the slow control circuit 33 determines whether the motor 20 can perform a slow start operation based on the speed command information S1, i.e., the rotating speed command signal Sc, and the rotating state and the driving state of the motor 20. Then, the slow control circuit 33 generates the second command information S3 based on a result of determining on whether the slow start operation can be performed and the speed command information S1 based on the rotating speed command signal Sc.

In this illustrative embodiment, the slow control circuit 33 determines that the motor 20 can perform the slow start operation when the Hall period signal S2 is low (L) in a state where the driving of the motor 20 is stopped. Also, in a state where the driving of the motor 20 is not stopped, the slow control circuit 33 determines that the motor 20 can perform the slow start operation.

Figure 4:
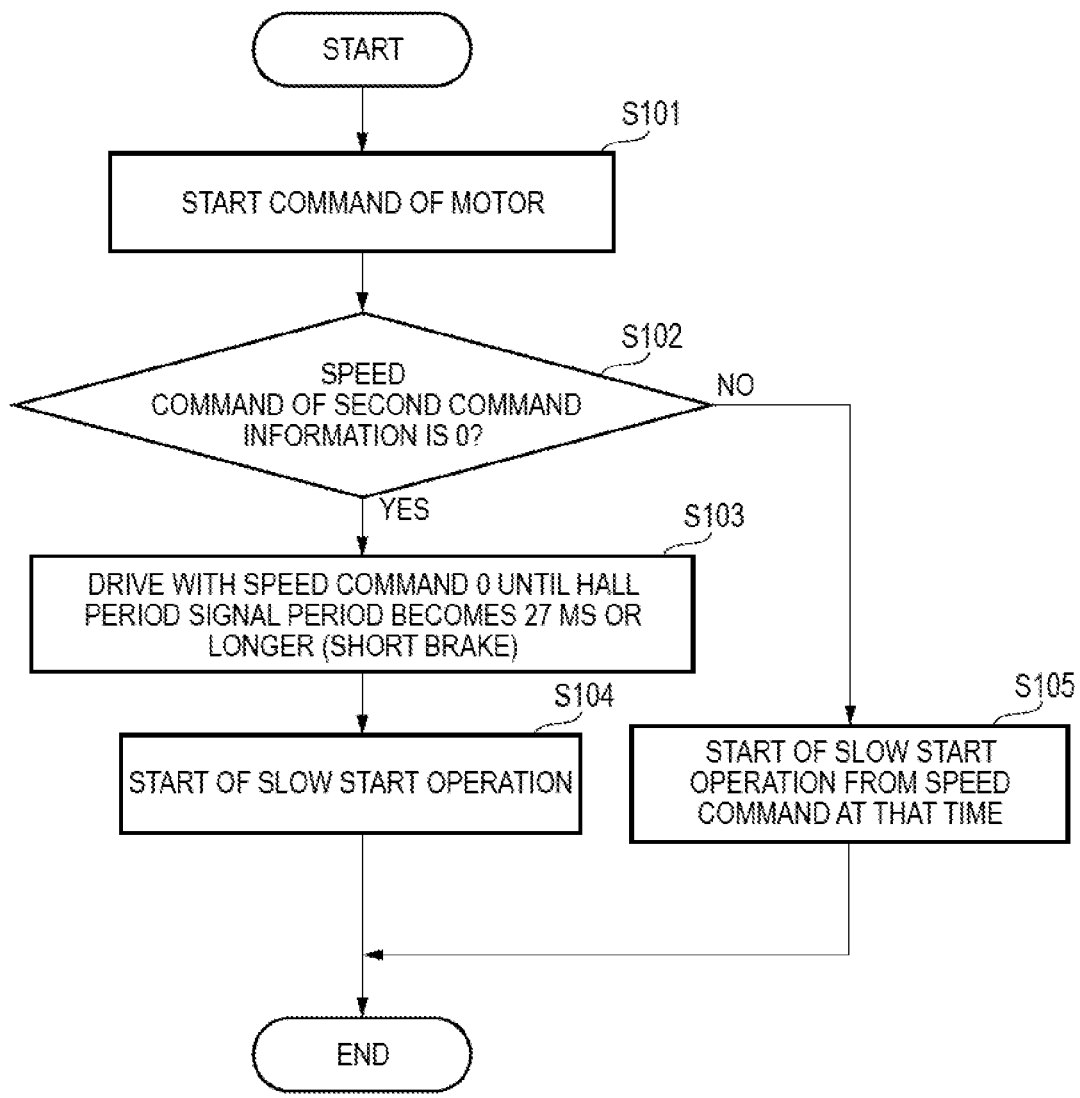
FIG. 4 is a flowchart showing an example of a control operation of the slow control circuit.

FIG. 4 is a flowchart showing an example of a control operation of the slow control circuit.

As shown in FIG. 4, in step S101, the slow control circuit 33 detects that a start command of the motor 20 is issued. For example, in a state where a predetermined value of the start signal Ss and the like are input and the control mode is thus set to the driving mode, the slow control circuit 33 detects that the start command is issued when the speed command information S1 (the target value of which the speed is not zero) for rotating the motor 20 is input to the slow control circuit 33 from the command signal processing circuit 31 based on the rotating speed command signal Sc.

In step S102, the slow control circuit 33 determines whether the speed command of the second command information S3 is zero, i.e., whether the driving of the motor 20 is stopped (the second command information S3 is zero) or not (the second command information S3 is a value which is not zero).

When it is determined in step S102 that the second command information S3 is zero (YES), the processing of step S103 is performed. That is, the slow control circuit 33 checks whether the Hall period signal S2 is low (L), i.e., the period of the Hall signal is 27 milliseconds or longer. When the period is 27 milliseconds or longer, the slow control circuit 33 determines that the slow start operation can be performed.

Here, when the period is not 27 milliseconds or longer, the slow control circuit 33 sets the second command information S3 to be zero such that the motor 20 is at a short brake state, until the period becomes 27 milliseconds or longer (until the Hall period signal S2 becomes low (L)). In other words, when the slow start operation cannot be performed, the control of setting the second command information S3 to be zero is performed until the slow start operation can be performed. At this time, the second command information S3 is kept at zero (0) until the period becomes 27 milliseconds or longer, irrespective of the speed command information S1. When the second command information S3 becomes zero, the motor 20 becomes the short brake state and the motor 20 is decelerated. When the period becomes 27 milliseconds or longer, i.e., when the slow start operation can be performed, the processing proceeds to step S104.

In step S104, the slow control circuit 33 starts to perform the slow start operation. That is, the slow control circuit 33 performs the control of gradually increasing the second command information S3 until it reaches the speed command information S1 (the target value). Accordingly, the motor 20 can perform the slow start operation, and the series of processing is over.

On the other hand, when it is determined in step S102 that the second command information S3 is not zero (NO), the processing of step 105 is performed. That is, when the driving of the motor 20 is not stopped, the slow control circuit 33 determines that a slow stop operation is performed and the motor 20 can perform the slow start operation. At this time, the slow control circuit 33 starts to perform the slow start operation from the present value of the second command information S3 towards the target value, and outputs the second command information S3 such that the motor 20 performs the slow start operation. Accordingly, the motor 20 performs the slow start operation, and the series of processing is over.

Figure 5:
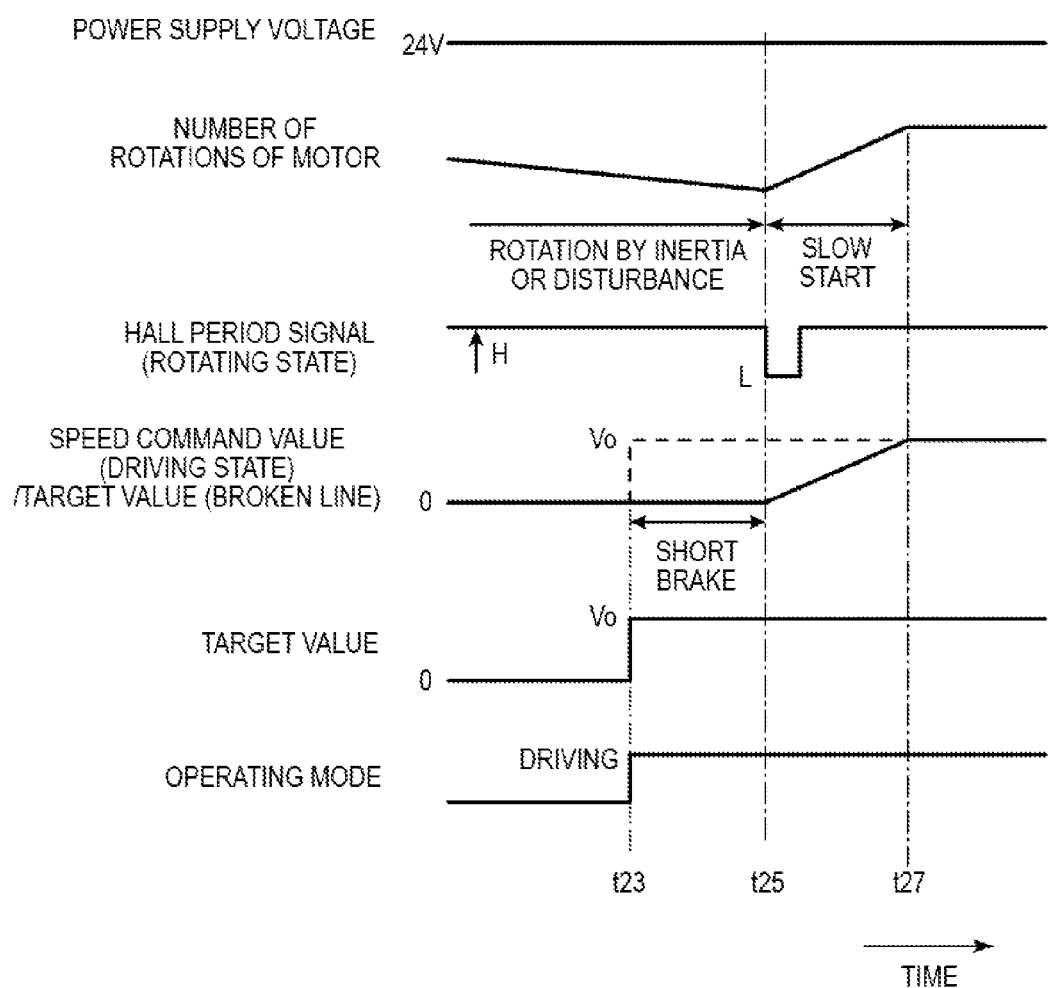
FIG. 5 is a timing chart showing an example of a slow start operation in the motor driving control device of the illustrative embodiment.

FIG. 5 is a timing chart showing an example of a slow start operation in the motor driving control device 1 of the illustrative embodiment.

FIG. 5 shows, from the upper, changes of the power supply voltage of the motor driving unit 2 of the motor driving control device 1, the number of rotations of the motor 20, the Hall period signal S2 obtained from the Hall signal Sh of the motor 20, a speed command value of the second command information S3, a value (a target value) of the speed command information S1 and an operating mode of the motor driving control device 1, over time, respectively.

As shown in FIG. 5, before a time t23, the driving of the motor 20 is stopped (the speed command value is zero) and the operating mode is the standby mode. At this time, the motor 20 is rotated by inertia or disturbance and the Hall period signal S2 is high (H).

In the above circumstance, it is assumed a case where the operating mode is set to the driving mode and the target number of rotations of the motor is set to Vo (a time t23). Since the driving of the motor 20 is stopped and the Hall period signal S2 is high (H), the slow start operation is not started and the motor 20 is controlled to become the short brake state.

At a time t25, when the number of rotations of the motor 20 is decreased, the Hall period signal S2 becomes low (L). Thereby, the slow control circuit 33 determines that the slow start operation can be performed. After the time t25, the slow control circuit 33 performs the control such that the second command information S3 is gently increased from zero to the target value Vo, and the driving current, which gradually become larger, flows in the motor 20. At a time t27, the second command information S3 reaches the target value Vo and the motor 20 reaches the target number of rotations.

In this way, in a state where the motor 20 is being rotated by inertia or disturbance, even when the start command of the motor 20 is issued, the slow start operation is not started. At this time, the control of causing the motor 20 to become the short brake state is first performed, and after the number of rotations of the motor 20 is sufficiently decreased, the slow start operation is started. Therefore, at start of the slow start operation, generation of large regenerative current is prevented, so that the power supply voltage is not increased.

Figure 6:
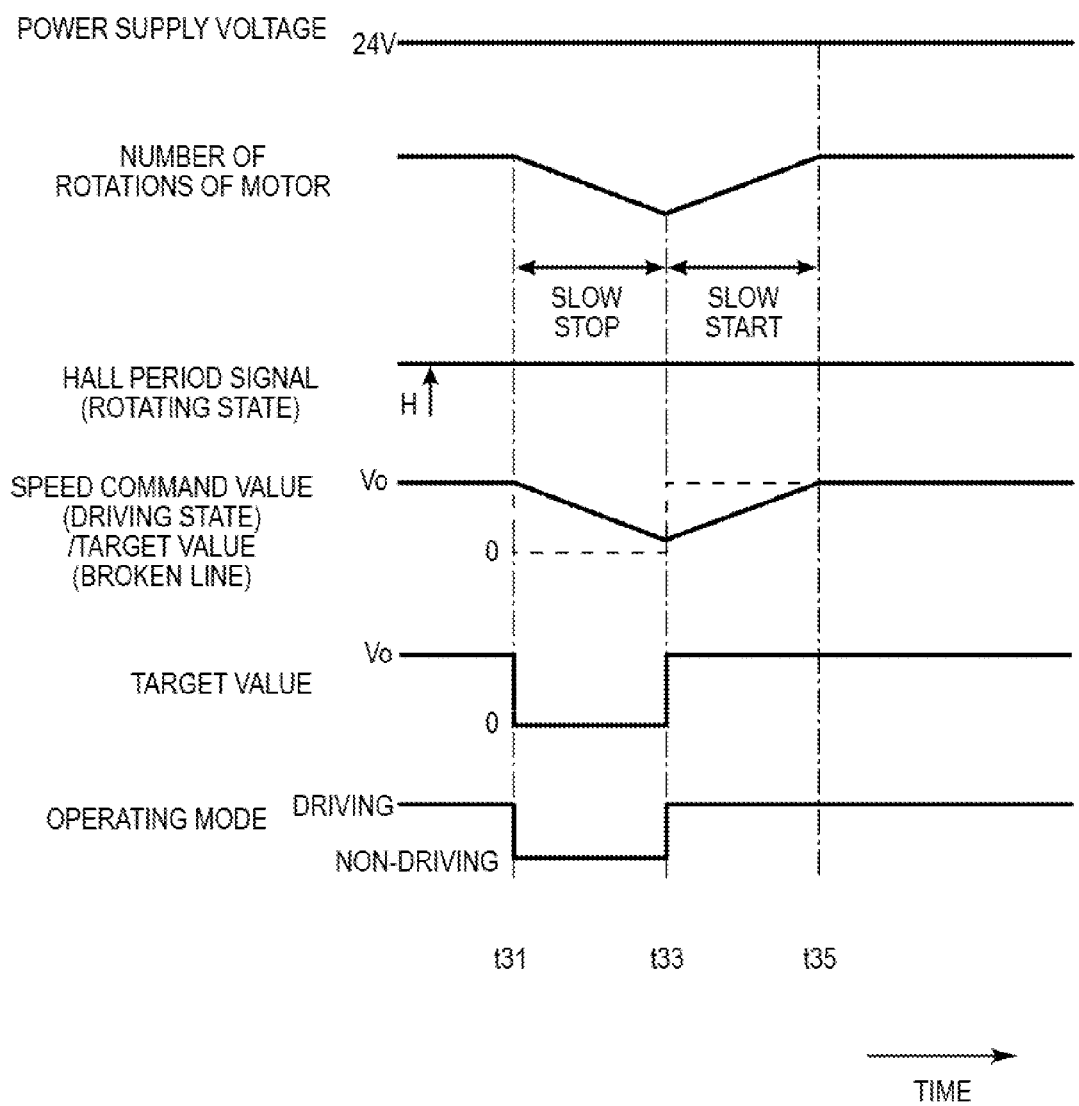
FIG. 6 is a timing chart showing another example of a slow start operation in the motor driving control device of the illustrative embodiment.

FIG. 6 is a timing chart showing another example of a slow start operation in the motor driving control device 1 of the illustrative embodiment.

FIG. 6 shows the operations of the respective units similarly to FIG. 5. FIG. 6 shows an example where a start command of the motor 20 is issued before the rotation of the motor 20 is completely stopped by a slow stop operation when the control of stopping the motor 20 is performed (a time t31).

That is, in a state where the motor 20 is being driven such that the second command information S3 becomes the target value Vo, the control of stopping the motor 20 is performed at the time t31. At this time, the target value becomes 'zero (0)' and the operating mode becomes a non-driving mode (standby mode). Thereby, the slow stop operation is started and the second command information S3 is gradually decreased towards the target value.

At a time t33 in a state where the second command information S3 is still larger than the target value 'zero (0)', when the start command of the motor 20 is issued, the operating mode becomes the driving mode and the target value becomes Vo. At this time, since the value of the second command information S3 is not 'zero (0)' and the driving of the motor 20 is not stopped, the slow start operation is started even though the Hall period signal S2 is at a high (H) state. That is, the control is performed such that the second command information S3 is gradually increased from the value of the second command information S3 at that time towards the target value Vo. Incidentally, when the value of the second command information S3 is larger than the target value Vo, the control is performed such that the second command information S3 is gradually decreased towards the target value Vo. At a time t35, when the second command information S3 reaches the target value Vo, the driving continues as it is.

In this way, in a state where the motor 20 is being controlled, when the start command of the motor 20 is issued, the slow start operation is immediately started. That is, in this case, since the number of rotations of the motor 20 is following the driving signal corresponding to the second command information S3 before and after the slow start operation is started, the regenerative current does not flow back even though the slow start operation is started. Therefore, the slow start operation is immediately started in accordance with the start command, so that it is possible to drive the motor 20 such that the rotating speed can rapidly become the target value.

[Effects of Illustrative Embodiment]

In this illustrative embodiment, when the start command of the motor 20 is issued, the slow start operation is started according to the rotating state and the driving state of the motor 20. Therefore, even when the motor 20 is at any rotating state and any driving state, it is possible to suppress the increase of the power supply voltage in the motor driving control device 1, thereby preventing the motor driving control device 1 from being damaged. Since it is possible to determine whether the slow start operation can be performed with a simple circuit, based on the rotating state and the driving state of the motor 20, it is possible to reduce the manufacturing cost of the motor driving control device 1.

If the slow start operation cannot be performed when the start command is issued, the motor 20 becomes the short brake state. Therefore, it is possible to rapidly decrease the number of rotations of the motor 20 and then to start the slow start operation.

[Others]

The control circuit unit is not limited to the circuit configuration as shown in FIG. 2. That is, a variety of circuit configurations can used to employ the inventive concept of the present invention.

Among the respective constituent elements of the motor driving control device, at least a part thereof may be implemented by software, not the hardware.

The motor which is driven by the motor driving control device of this illustrative embodiment is not limited to the three-phase brushless motor and the other motors may be also employed.

The present invention is not limited to the motor driving control device which drives the motor by the sine wave driving method, and the inventive concept of the present invention can be also applied to a motor driving control device which drives the motor by a square wave driving method.

In the above illustrative embodiment, a part or all of the processing may be executed by the software or a hardware circuit.

While the present invention has been shown and described with reference to certain illustrative embodiments thereof, it will be understood by those skilled in the art that various changes in form and details may be made therein without departing from the spirit and scope of the invention as defined by the appended claims.

What is claimed is:

1. A motor driving control device comprising:
a rotation detecting unit configured to detect a rotating state of a motor, the rotating state including current rotation speed of the motor;
a drive detecting unit configured to detect a driving state of the motor, the driving state including whether the motor is instructed to stop or to rotate;
a command acquiring unit configured to acquire first command information that indicates target rotation speed of the motor;
a state determining unit configured to determine whether the motor can perform a slow start operation based on a detection result of the rotation detecting unit and a detection result of the drive detecting unit, when the command acquiring unit acquires the first command information indicating the target rotation speed to start rotation of the motor;
a control unit configured to generate second command information corresponding to a speed at which the motor is to be rotated, based on a determination result of the state determining unit and the first command information acquired by the command acquiring unit; and
a motor driving unit configured to output a driving signal corresponding to the second command information generated by the control unit to the motor so as to drive the motor,
wherein when it is determined that the motor can perform the slow start operation by the state determining unit, the control unit is configured to generate the second command information such that the motor performs the slow start operation,
wherein the drive detecting unit is configured to detect whether the motor is instructed to stop based on the second command information generated by the control unit,
wherein the rotation detecting unit is configured to detect whether a rotating speed of the motor is smaller than a predetermined value, and
wherein in a state where the drive detecting unit detects that the motor is instructed to stop, the state determining unit is configured to determine that the motor can perform the slow start operation when the rotation detecting unit detects that the rotating speed of the motor is smaller than the predetermined value.

2. The motor driving control device according to claim 1, wherein the state determining unit is configured to determine that the motor can perform the slow start operation when the drive detecting unit detects that the driving of the motor is not stopped.

3. The motor driving control device according to claim 1, further comprising:
a short brake unit configured to control the motor driving unit such that the motor becomes a short brake state when the drive detecting unit detects that the driving of the motor is stopped and when the rotation detecting unit detects that the rotating speed of the motor is not smaller than the predetermined value.

4. The motor driving control device according to claim 1, wherein a part or all of the motor driving control device is packaged as an integrated circuit device.

5. A control method of a motor driving control device including: a rotation detecting unit configured to detect a rotating state of a motor, the rotating state including current rotation speed of the motor; a drive detecting unit configured to detect a driving state of the motor, the driving state including whether the motor is instructed to stop or to rotate; and a command acquiring unit configured to acquire first command information that indicates target rotation speed of the motor, the control method comprising:
when the command acquiring unit acquires the first command information indicating the target rotation speed to start rotation of the motor, determining whether the motor can perform a slow start operation based on a detection result of the rotation detecting unit and a detection result of the drive detecting unit;
generating second command information corresponding to a speed at which the motor is to be rotated, based on a determination result of the state determining unit and the first command information acquired by the command acquiring unit; and
outputting a driving signal corresponding to the generated second command information to the motor so as to drive the motor,
wherein when it is determined that the motor can perform the slow start operation, the generating step generates the second command information such that the motor performs the slow start operation,
wherein the drive detecting unit is configured to detect whether the motor is instructed to stop based on the second command information generated by the control unit,
wherein the rotation detecting unit is configured to detect whether a rotating speed of the motor is smaller than a predetermined value, and
wherein the determination that the motor can perform the slow start operation is based on the drive detecting unit determining that the motor is instructed to stop and the rotation detecting unit detecting that the rotating speed of the motor is smaller than the predetermined value.

* * * * *